(12) United States Patent
Liu et al.

(10) Patent No.: US 8,112,416 B2
(45) Date of Patent: Feb. 7, 2012

(54) METHOD AND SYSTEM FOR SEMANTIC PUBLISH-SUBSCRIBE SERVICES

(75) Inventors: Zhen Liu, Tarrytown, NY (US);
Srinivasan Parthasarathy, White Plains, NY (US); Anand Ranganathan, White Plains, NY (US); Hao Yang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1292 days.

(21) Appl. No.: 11/754,068

(22) Filed: May 25, 2007

(65) Prior Publication Data

US 2008/0294644 A1    Nov. 27, 2008

(51) Int. Cl.
G06F 7/00     (2006.01)
(52) U.S. Cl. ........................ 707/720; 707/722
(58) Field of Classification Search .................. 707/720, 707/722
See application file for complete search history.

(56) References Cited

U.S. PATENT DOCUMENTS

2005/0197828 A1* 9/2005 McConnell et al. .............. 704/9
2007/0011155 A1* 1/2007 Sarkar .............................. 707/5

OTHER PUBLICATIONS

Zhou et al., "Minerva: A Scalable OWL Ontology Storage and Inference System", In Poceedings of the 1st Asian Semantic Web Symposium, 2004.
Wang, et al., "An Ontology-Based Publish/Subscribe System", In Middleware '04: Proceedings of the 5th ACM/IFIP/USENIX international conference on Middleware, pp. 232-253, New York, NY, USA, 2004. Springer-Verlag New York, Inc.
Petrovic, et al., "S-ToPSS: Semantic Toronto Publish/Subscribe System", In Proceedings of 29th International Conference on Very Large Data Bases, pp. 1101-1104, 2003.
Grosof, et al., "Description Logic Programs: Combining Logic Programs with Description Logic", In WWW, pp. 48-57, 2003.
Cilia, et al., "Cream: An infrastructure for distributed, heterogeneous event-based applications", In Proceedings of the International Conference on Cooperative Information Systems, pp. 482-502, 2003.
Cugola, et al., "Exploiting an event-based infrastructure to develop complex distributed systems", in ICSE '98: Proceedings of the 20th international conference on Software engineering, pp. 261-270, Washington, DC, USA, 1998. IEEE Computer Society.
Chirita, et al., "Publish/Subscribe for RDF-based P2P Networks", In Proceedings of the 1st European Semantic Web Symposium, 2004.
Chan, et al., "Efficient filtering of xml documents with xpath expressions", The VLDB Journal, 11 (4): 354-379, 2002.
Carzaniga, et al., "Design and evaluation of a wide-area event notification service", ACM Transactions on Computer Systems, vol. 19, No. 3: 332-383, Aug. 2001.

(Continued)

Primary Examiner — Shahid Alam
Assistant Examiner — Donald Lawson
(74) Attorney, Agent, or Firm — William J. Stock; F. Chau & Associates, LLC

(57) ABSTRACT

A semantic publish-subscribe system, including: a plurality of subscribers; a plurality of publishers; and a server that receives and stores subscriptions that are described in web ontology language (OWL) graph patterns from the plurality of subscribers and that receives events that are described in semantic graphs formed by OWL assertions from the plurality of publishers, wherein when the server receives an event from a publisher, the server expands the OWL assertions of the event using a reasoner to produce an expanded event, the server matches the expanded event to a subscription, and then, the server notifies a subscriber whose interest matches the event.

17 Claims, 10 Drawing Sheets

OTHER PUBLICATIONS

Altinel et al., "Efficient Filtering of XML Documents for Selective Dissemination of Information", In VDLB '00: Proceedings of the 26th International Conference on Very Large Data Bases, pp. 53-64, San Francisco, CA, USA, 2000. Morgan Kaufmann Publishers Inc.

Aguilera et al., "Matching Events in a Content-based Subscription System", In PODC '99: Proceedings of the eighteenth annual ACM Symposium on Principles of distributed computing, pp. 53-61, New York, NY, USA, 1999. ACM Press.

Pereira et al., "WebFilter: A High-throughput XML-based Publish and Subscribe System", in VLDB '01: Proceedings of the 27th International Conference on Very Large Data Bases, pp. 723-724, San Francisco, CA, USA, 2001. Morgan Kaufmann Publishers Inc.

* cited by examiner

A. Example Event

B. Example Subscription

METHOD AND SYSTEM FOR SEMANTIC PUBLISH-SUBSCRIBE SERVICES

BACKGROUND OF THE INVENTION

1. Technical Field

The present invention relates to publish-subscribe systems, and more particularly, to a method and system for semantic publish-subscribe services.

2. Discussion of the Related Art

Publish-subscribe systems interconnect information providers to information consumers in a distributed environment. In such systems, information providers publish information in the form of events, information consumers subscribe to events that satisfy certain conditions specified by the consumers and the system ensures the timely delivery of published events to all interested subscribers.

Publish-subscribe systems are often classified as topic-based (or group-based) and content-based. In topic-based systems such as those described in B. Oki, M Pfluegl, A. Siegal, and D. Skeen. "The Information Bus: An Architecture for Extensible Distributed Systems". Operating Systems Review, 27(5):58-68, December 1993 and D. Powell. "Group Communications". Communications of the ACM, 39(4):50-97, April 1996, publishers label each event with a topic name, while consumers subscribe to all events in a particular topic.

In content-based systems such as those described in G. Cugola, E. Nitto, and A. Fuggetta. "Exploiting an Event-based Infrastructure to Develop Complex: Distributed Systems" Proc. IEEE International Conference on Software Engineering (ICSE), pp. 261-270, 1998, M. Aguilera, R. Strom, D. Sturman, M. Astley. and T. Chandra. "Matching Events in a Content-based Subscription System", Proc. ACM Symposium on Principles of Distributed Computing (PODC), pp. 53-61, 1999 and A. Carzaniga, D. Rosenblum, and A. Wolf. "Design and Evaluation of a Wide-Area Event Notification Service". ACM Transactions on Computer Systems, 19(3):332-383, August 2000, subscribers can choose filtering criteria along multiple dimensions, and they get all events that meet the specified criteria.

These filtering criteria are often expressed using attribute-value pairs or extensible markup language (XML)-based tree structures. A drawback of such topic-based or content-based publish-subscribe systems is the lack of expressivity when users specify their subscription interests or label their published events.

In recent years, a few publish-subscribe systems have been proposed to match subscriptions and events based on their semantics. The S-ToPSS system described in M. Petrovic, I. Burcea, and H. Jacobsen. "S-ToPSS: Semantic Toronto Publish/Subscribe System". Proc. International Conference on Very Large Data Bases (VLDB), pp. 1101-1104, 2003, takes into account synonyms and concept hierarchies in the matching process. The Ontology-based Pub-sub System (OPS) described in J. Wang, B. Jin, and J. Li. "An Ontology-based Publish/Subscribe System". Proc ACM/IFIP/USENIX 8th International Middleware Conference, pp. 232-253, 2004, uses resource description framework (RDF) graphs and graph patterns to represent subscriptions and events. P. Chirita, S. Idreos, M. Koubarakis, and W. Nejdl. "Publish/Subscribe for RDF-based P2P Networks". Proc. European Semantic Web Symposium, 2004 uses RDF to enhance publish-subscribe services in peer to peer (P2P) networks. While these systems are more expressive than the traditional topic-based or content-based systems, they still suffer from several drawbacks. For example, they do not make use of reasoning or domain knowledge in ontologies to aid the matching process, thus they may fail to identify semantically relevant events for the subscribers. In addition, they typically use restricted graphs (e.g., all RDF triples in an event must have the same subject) to represent subscriptions and events, thus they are less expressive than an ideal system based on general graphs. Further, they all have scalability limits when the size of the system increases, and generally, do not work well under a large number of subscriptions and a high volume of events.

SUMMARY OF THE INVENTION

In an exemplary embodiment of the present invention, a semantic publish-subscribe system, comprises: a plurality of subscribers; a plurality of publishers; and a server that receives and stores subscriptions that are described in web ontology language (OWL) graph patterns from the plurality of subscribers and that receives events that are described in semantic graphs formed by OWL assertions from the plurality of publishers, wherein when the server receives an event from a publisher, the server expands the OWL assertions of the event using a reasoner to produce an expanded event, the server matches the expanded event to a subscription, and then, the server notifies a subscriber whose interest matches the event.

The reasoner is a description logic (DL) reasoner. The expanded event includes the original event and new OWL assertions. The new OWL assertions are a set of triples that describe additional information about the original event.

A graph pattern of a first subscription of the subscriptions is a set of triple patterns, wherein each triple pattern includes three elements and each element is a resource description framework (RDF) term or variable, wherein the first subscription includes a set of value constraints, wherein a value constraint in the first subscription is a boolean-valued expression of variables defined in the graph pattern of the first subscription.

The expanded event is matched to the first subscription by, determining if there is a pattern solution defined on the variables in the graph pattern of the first subscription such that: after substituting variables in the graph pattern of the first subscription according to the pattern solution, the resulting graph is a sub-graph of the expanded event; and for every value constraint in the first subscription, a logical expression obtained after substituting variables in the value constraints of the first subscription according to the pattern solution is true, wherein if the pattern solution is satisfied, the original event matches the first subscription.

The subscriptions are stored in a linked-chains structure by, creating a chain of nodes for each subscription, wherein for each subscription each node in the chain of nodes represents a triple pattern in the subscription; arranging the nodes in each chain of nodes in a decreasing order of selectivity, wherein nodes that are in different chains or the same chain are linked to each other if their triple patterns are equivalent; and inserting the chain of nodes for each subscription into a queue by using a chain ordering algorithm The expanded event is matched to the subscription by, beginning with a first subscription in the queue and continuing until the queue becomes empty, for each subscription, evaluating the nodes in its chain of nodes from top to bottom, and for each node, checking the node against the event and finding solutions for the variables in the triple pattern of the node, wherein if no solution is found, discarding the currently evaluated subscription and proceeding to the step of evaluating the node for a next subscription, wherein if all nodes in the chain of nodes for the currently evaluated subscription have one or more solutions, computing a set of combined solutions for all variables in the currently evaluated subscription, wherein for each combined solution, checking value constraints of the currently evaluated subscription to determine if the combined solution satisfies these constraints, wherein if there is at least one combined solution that satisfies all value constraints in the currently evaluated subscription, returning the event as a match to the subscriber from whom the currently evaluated subscription was received.

When a new subscription is received the new subscription is stored in the linked-chains structure by, creating a new chain of nodes for the new subscription, wherein the nodes in the new chain of nodes are ordered from top to bottom in decreasing selectivity; for each node in the new chains of nodes, an equivalent node having an equivalent triple pattern in the existing chains of nodes is searched for, and if an equivalent node is found, a link between the equivalent nodes is created; and inserting the new chain of nodes into the queue by using the chain ordering algorithm.

The chain ordering algorithm determines an order of subscriptions in the queue by, constructing a complete graph and a weight function, wherein each node in the complete graph corresponds to one subscription, and a weight of an edge of the complete graph is a cost difference of evaluating a first subscription of a pair of subscriptions before a second subscription of the pair of subscriptions, as compared to evaluating the second subscription before the first subscription; sorting the edges in an increasing order of weights; starting from a least-weighted edge and continuing until a greatest-weighted edge, selecting the edge, if the edge alone or together with an already selected edge, does not cause a vertex to have a degree of three or more and does not form a cycle, unless the number of selected edges equals the number of vertices in the set of nodes in the complete graph; and outputting a set of edges that covers the vertex and that has a least cost, wherein the set of edges defines the order of the subscriptions in the queue.

In an exemplary embodiment of the present invention, a server for a semantic publish-subscribe system, comprises: a subscription maintenance module for receiving and storing subscriptions that are described in OWL graph patterns from a plurality of subscribers; a reasoning module for receiving events that are described in semantic graphs formed by OWL assertions from a plurality of publishers and for expanding the OWL assertions of the events to produce expanded events; and a matching module for matching the expanded events to the subscriptions and notifying subscribers whose interests match the events.

The server further comprises a linking module for creating a chain of nodes for each of the subscriptions and linking equivalent nodes in one or more of the chains of nodes so that a node which is equivalent to at least one other node is discarded so that it will not be evaluated again during the matching.

In an exemplary embodiment of the present invention, a computer program product comprises a computer useable medium having computer program logic recorded thereon for matching an event to a subscription in a semantic publish-subscribe system, the computer program logic comprising: program code for receiving and storing subscriptions that are described in OWL graph patterns from a plurality of subscribers; program code for receiving events that are described in semantic graphs formed by OWL assertions from a plurality of publishers and for expanding the OWL assertions of the events to produce expanded events; and program code for matching the expanded events to the subscriptions and notifying subscribers whose interests match the events.

The computer program logic further comprising program code for creating a chain of nodes for each of the subscriptions and linking equivalent nodes in one or more of the chains of nodes so that a node which is equivalent to at least one other node is discarded so that it will not be evaluated again during the matching.

In an exemplary embodiment of the present invention, a method for matching an event to a subscription in a semantic publish-subscribe system, comprises: receiving and storing subscriptions that are described in OWL graph patterns from a plurality of subscribers; receiving an event from a publisher that is described in a semantic graph formed by OWL assertions; expanding the OWL assertions of the event by using reasoning to produce an expanded event; matching the expanded event to a subscription; and notifying the subscriber whose interest matches the event.

The reasoning is DL reasoning. The expanded event includes the original event and new OWL assertions. The new OWL assertions are sets of triples that describe additional information about the original event.

A graph pattern of a first subscription of the subscriptions is a set of triple patterns, wherein each triple pattern includes three elements and each element is an RDF term or variable, wherein the first subscription includes a set of value constraints, wherein a value constraint in the first subscription is a boolean-valued expression of variables defined in the graph patient of the first subscription.

The expanded event is matched to the first subscription by, determining if there is a pattern solution defined on the variables in the graph pattern of the first subscription such that: after substituting variables in the graph pattern of the first subscription according to the pattern solution, the resulting graph is a sub-graph of the expanded event; and for every value constraint in the first subscription, a logical expression obtained after substituting variables in the value constraints of the first subscription according to the pattern solution is true, wherein if the pattern solution is satisfied, the original event matches the first subscription.

In an exemplary embodiment of the present invention, a method for matching an event to a subscription in a semantic publish-subscribe system, comprises: receiving and storing subscriptions that are described in OWL graph patterns from a plurality of subscribers, wherein the subscriptions are stored in a linked-chains structure by, creating a chain of nodes for each subscription, wherein for each subscription each node in the chain of nodes represents a triple pattern in the subscription; arranging the nodes in each chain of nodes in a decreasing order of selectivity, wherein nodes that are in different chains or the same chain are linked to each other if their triple patterns are equivalent; and inserting the chain of nodes for each subscription into a queue by using a chain ordering algorithm; receiving an event from a publisher that is described in a semantic graph formed by OWL assertions; expanding the OWL assertions of the event by using reasoning to produce an expanded event; and matching the expanded event to a subscription by, beginning with a first subscription in the queue and continuing until the queue becomes empty, for each subscription, evaluating the nodes in its chain of nodes from top to bottom, and for each node, checking the node against the event and finding solutions for the variables in the triple pattern of the node, wherein if no solution is found, discarding the currently evaluated subscription and proceeding to the step of evaluating the node for a next subscription, wherein if all nodes in the chain of nodes for the currently evaluated subscription have one or more solutions, computing a set of combined solutions for all variables in the currently evaluated subscription, wherein for each combined solution, checking value constraints of the currently evaluated subscription to determine if the combined solution satisfies these constraints, wherein if there is at least one combined solution that satisfies all value constraints in the currently evaluated subscription, returning the event as a match to the subscriber from whom the currently evaluated subscription was received.

Two triple patterns are equivalent if they have equivalent subject fields, equivalent predicate fields and equivalent object fields, or if they are the same non-variable term, or if they are variable terms that can be unified.

When a new subscription is received the new subscription is stored in the linked-chains structure by, creating a new chain of nodes for the new subscription, wherein the nodes in the new chain of nodes are ordered from top to bottom in decreasing selectivity; for each node in the new chains of nodes, an equivalent node having an equivalent triple pattern in the existing chains of nodes is searched for, and if an equivalent node is found, a link between the equivalent nodes is created; and inserting the new chain of nodes into the queue by using the chain ordering algorithm.

The chain ordering algorithm determines an order of subscriptions in the queue by, constructing a complete graph and a weight function, wherein each node in the complete, graph corresponds to one subscription, and a weight of an edge of the complete graph is a cost difference of evaluating a first subscription of a pair of subscriptions before a second subscription of the pair of subscriptions, as compared to evaluating the second subscription before the first subscription; sorting the edges in an increasing order of weights; starting from a least-weighted edge and continuing until a greatest-weighted edge, selecting the edge, if the edge alone or together with an already selected edge, does not cause a vertex to have a degree of three or more and does not form a cycle, unless the number of selected edges equals the number of vertices in the set of nodes in the complete graph; and outputting a set of edges that covers the vertex and that has a least cost, wherein the set of edges defines the order of the subscriptions in the queue.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

In accordance with an exemplary embodiment of the present invention, a semantic publish-subscribe system that allows events and subscriptions to be described in a semantic manner is provided. In particular, we use a web ontology language (OWL) (described in D. McGuinness and F. van Harmelen. Owl web ontology language overview. In W3C Recommendation, 2004, a copy of which is incorporated by reference herein in its entirety), a semantic web language, which is based on resource description framework (RDF) (described in D. Beckett. Rdf/xml syntax specification. http://www.w3.org/TR/rdf-syntax-grammer, a copy of which is incorporated by reference herein in its entirety) to describe events and subscriptions. For example, events, in our system, are represented as semantic graphs formed by OWL assertions. Subscriptions are represented as OWL graph patterns.

Figure 1:
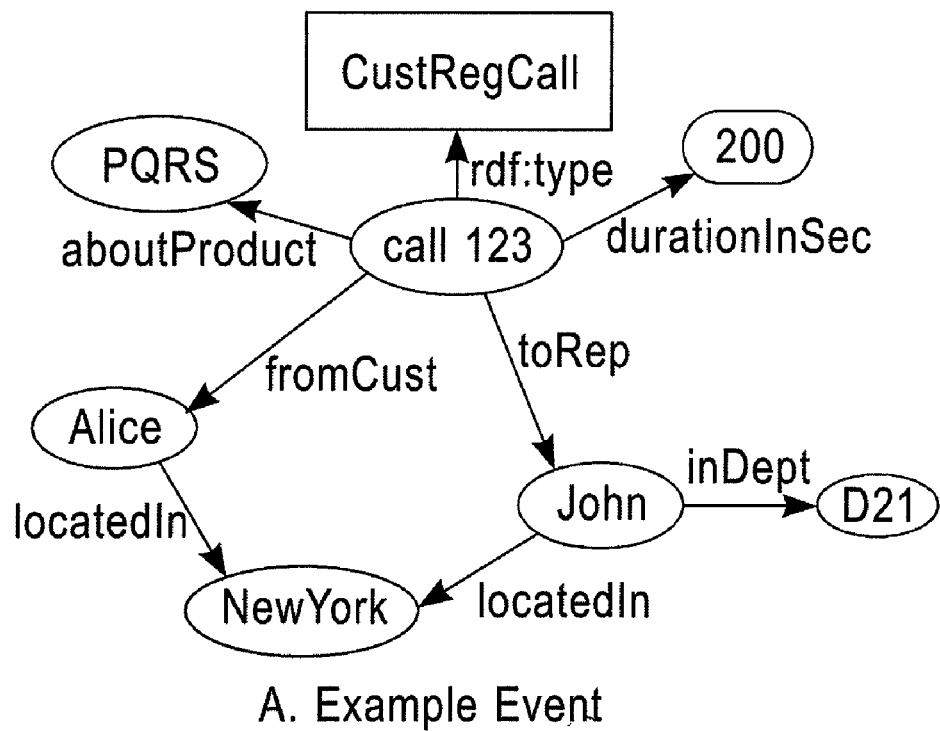
FIG. 1 shows an example of a semantic event and a semantic subscription according to an exemplary embodiment of the present invention.
Figure 1:
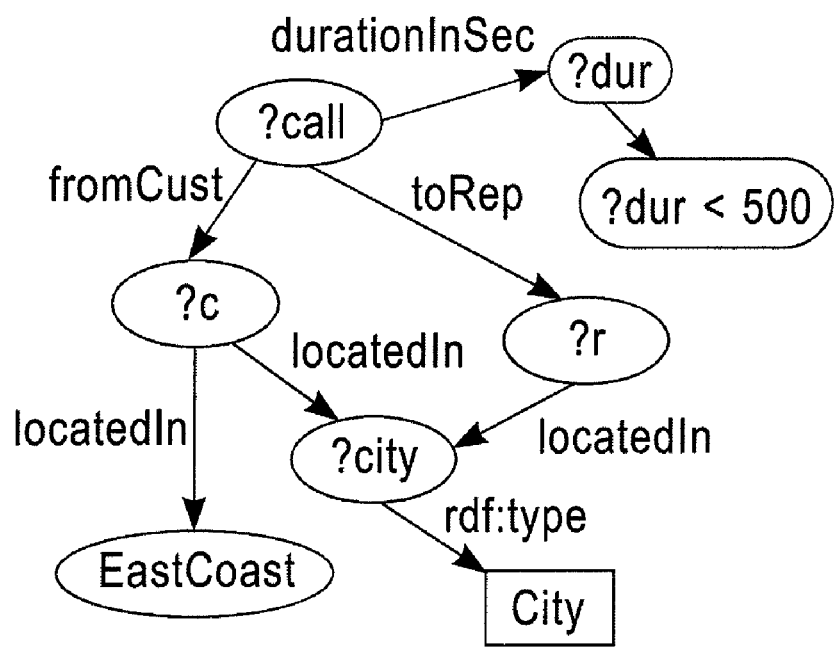

FIG. 1 shows an exam pie of a semantic event and a semantic subscription. The event describes a specific customer registration call, call 123, from a customer, Alice to a representative, John, who are both located in New York. In addition, John is in department D21 and the call duration is 200 seconds. The subscription is for any call, represented by ?call, from any customer, in the EastCoast, to any representative, such that the customer and the representative are located in the same city. Moreover, the duration of the call should be less than 500 seconds.

A feature of the semantic publish-subscribe system is its ability to support highly expressive and flexible subscriptions. Users can express their subscriptions in far more detail and can use richer constructs than compared to traditional attribute-value pairs or tree-based approaches. The use of semantics also greatly improves the power and flexibility of the matching process. Domain knowledge in ontologies as well as description logic reasoning can be used to help match events to subscriptions that may otherwise not be matched. However, one side-effect of having such a highly expressive and powerful system is that the events and subscriptions are both graph-based, which makes the event matching process very complex. As such, the efficiency of the matching algorithm in use becomes a critical issue for system performance.

In accordance with another exemplary embodiment of the present invention, an algorithm that can match events to large number of subscriptions is provided to improve the scalability of the system. The main idea behind the algorithm is to exploit the overlaps among the subscriptions. For example, if two subscriptions share some sub-patterns (or OWL triple patterns), we can avoid checking such sub-patterns repeatedly by reusing intermediate matching results. The matching algorithm uses a linked-chains data structure to represent subscriptions, which can effectively enable the reuse of intermediate results. Moreover, it uses a chain ordering technique, which is based on an analytical model of evaluation costs, to reduce processing overhead of the matching process.

A description of exemplary embodiments of the present invention will now be provided in further detail under the following headings: Models and Formal Descriptions, Architecture, Efficient Matching Algorithm and Performance Evaluation.

Models and Formal Descriptions

The semantic publish-subscribe system makes use of a highly expressive representation for events and subscriptions. In light of this, we will now present the formal definitions for semantic events and subscriptions, as well as semantic event-subscription matching.

Ontologies

The semantic events and subscriptions are defined with respect to certain ontologies. An ontology is a formal description of the entities in the domain of interest as well as the relationship between entities. In the exemplary embodiments to be discussed hereinafter, we use ontologies specified OWL. An OWL ontology describes concepts (or classes), properties and individuals (or instances) relevant to the domain of interest.

The OWL ontologies use Description Logics (DL) as described in F. Baader, D. Calvanese, D. L. McGuiness, D. Nardi, and P. F. Patel-Schneider, editors. The Description Logic Handbook: Theory, Implementation, and Applications. Cambridge University Press, 2003, a copy of which is incorporated by reference herein in its entirety, to represent and reason about the terminological knowledge of an application domain. DL is an expressive and decidable subset of first order logic. DL describes two kinds of knowledge: "TBox" (terminological box) and "ABox" (assertion box). The TBox contains sentences describing concepts and properties. The TBox describes concept hierarchies and the domains and ranges of properties. The ABox contains "ground" sentences about individuals (or instances). The ABox describes the concepts to which an individual belongs and its relationship to other individuals. OWL is defined on top of RDF.

Figure 2A:
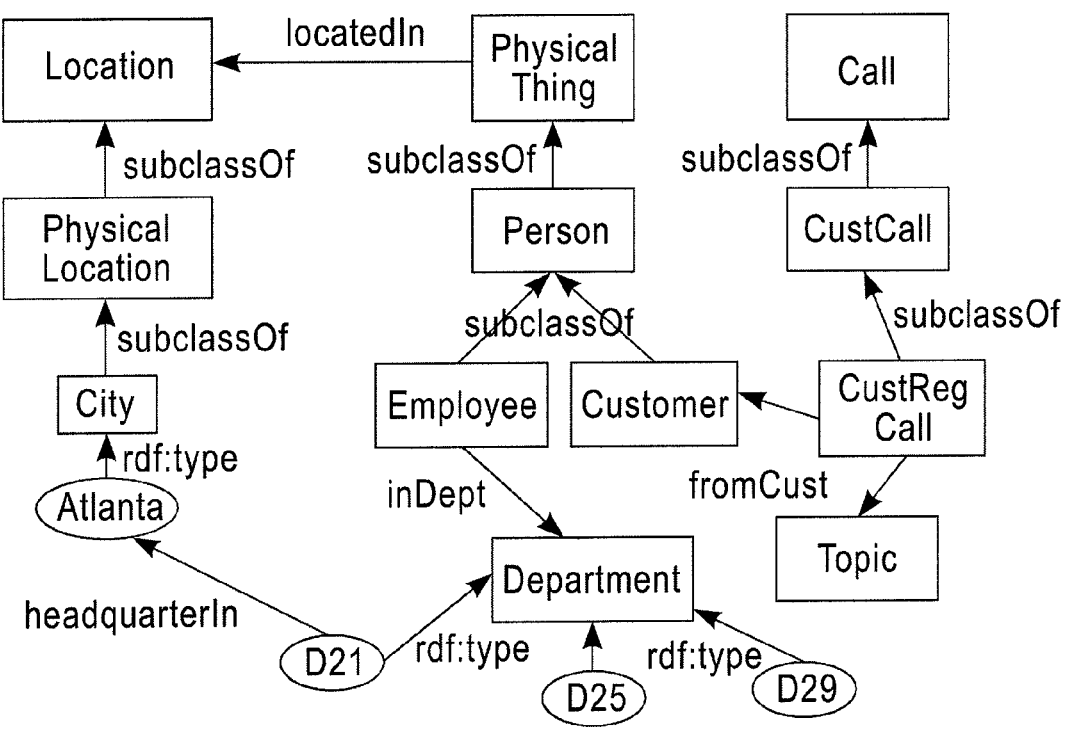
FIG. 2A shows a portion of a customer service ontology according to an exemplary embodiment of the present invention.
Figure 2B:
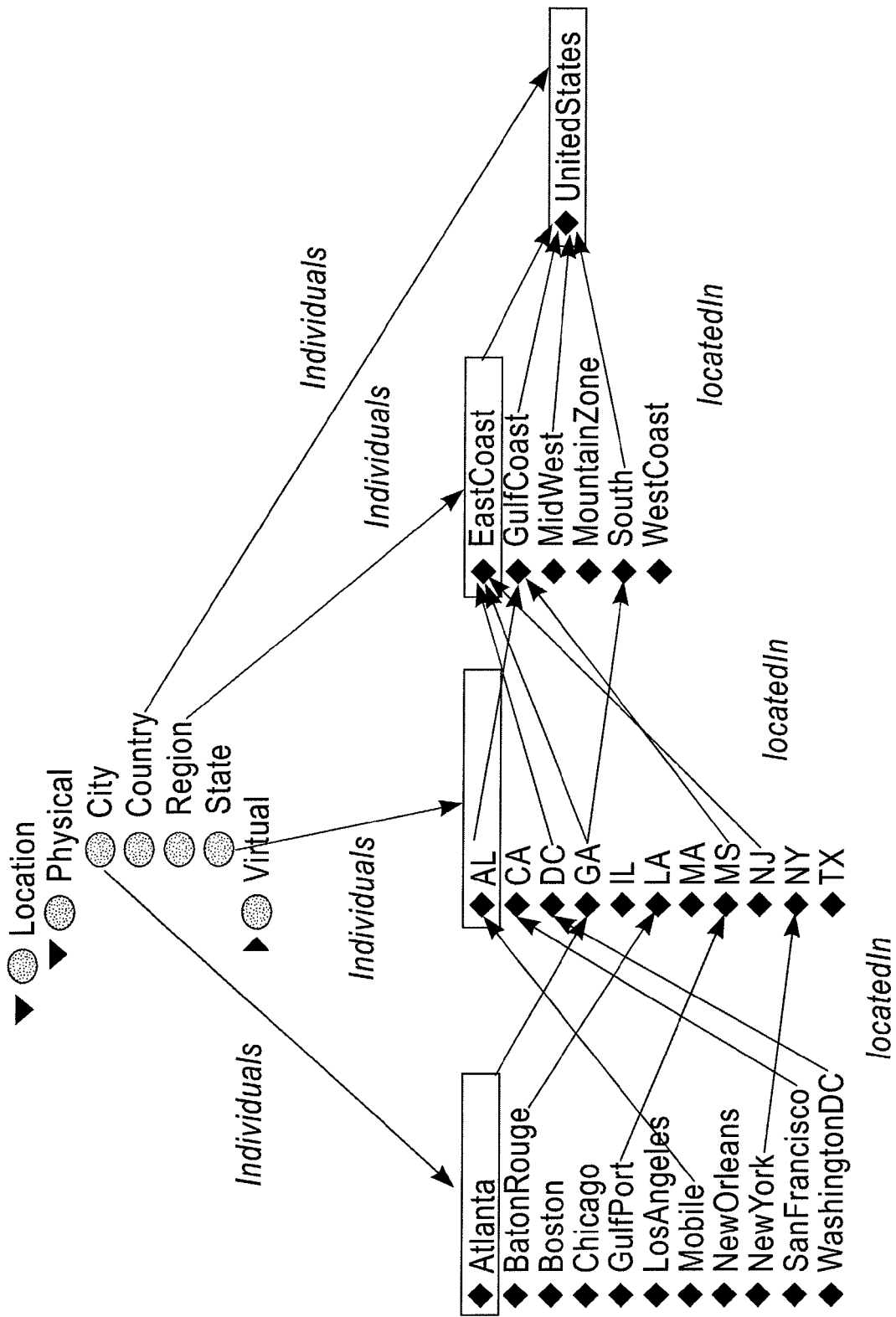
FIG. 2B shows a portion of a location ontology according to an exemplary embodiment of the present invention.

FIGS. 2A and 2B describe portions of ontologies for a customer service domain. The ontology in FIG. 2A defines concepts like Customer, Call, Department, etc. (represented by rectangles). These concepts are associated with a hierarchy through subclassOf relationships. Properties (represented by labels on arrows) are associated with a domain and a range. For example, the domain of locatedIn is PhysicalThing and the range is Location. Individuals (like D21, represented using ellipses, belong to one or more concepts (e.g., Department) and may be related to other individuals via properties (e.g., D21 headquarterIn Atlanta). Note that rdf:type is a special property defined in RDF that is used to state that an individual (e.g., D21) belongs to a concept (e.g., Department).

The ontology shown in FIG. 2B provides domain knowledge about different locations. The ontology defines various concepts like State, City and Region. The ontology states that individuals AL, CA, etc. belong to the concept State. The ontology also defines the locatedIn property between different locations. For example, it states that Atlanta is located in GA and GulfCoast is located in the United States.

Semantic Events

In this section, we begin with some preliminary definitions from RDF and OWL, and then, describe a semantic event.

Definition 1 (RDF Term). Let U be the set of all universal resource identifiers (URIs). Let $RDF_L$ be the set of all RDF Literals (which are data values that may be associated with a type). The set of RDF Terms, denoted by $RDF_T$, is $U \cup RDF_L$. Note that RDF also defines blank nodes, which we do not include in our model.

Definition 2 (RDF Triple). An RDF triple contains three components: a subject, a predicate (or property) and an object. The subject and predicate are represented as a URI, while the object is an RDF Term. An RDF triple is typically written in the form (subject predicate object). An example is (Alice locatedIn New York).

Definition 3 (RDF Graph). An RDF Graph is a set of RDF triples. The set of vertices in an RDF graph is the set of subjects and objects in the triples. The edges in the graph are labeled by the predicates.

Definition 4 (OWL Axiom). An OWL axiom is a sentence in the TBox of an ontology that gives information about classes and properties. This information includes subclass and subproperty relationships, whether a certain property is transitive, symmetric or functional, or the inverse of another property, restrictions on the values of a property, etc. OWL axioms may be represented as RDF triples. An example is (Employee subClassOf Person).

Definition 5 (OWL Fact). An OWL fact is an ABox assertion that states information about a particular individual, in the form of classes that the individual belongs to or its relationship to other individuals, OWL facts may also be represented as RDF triples. An example is (John rdf:type Employee).

Definition 6 (Event). An Event is an RDF graph where all the triples are OWL facts. An example of an event (shown graphically in FIG. 1) is {(call123 rdf:type CustRegCall), (call123 fromCust Alice), (call123 durationInSec 200), (call123 toRep John), (call123 aboutProduct PQRS), (Alice locatedIn NewYork), (John inDept D21), (John locatedIn New York)}.

Note that an event only contains OWL facts, i.e., assertions about different individuals and how they are related. The event does not contain TBox axioms, i.e., it does not define new concepts or properties, or extend the definitions of existing concepts and properties. An event only uses concepts and properties defined in the ontology.

Semantic Subscriptions

We define a subscription as a semantic graph pattern where some nodes and edges in the graph are variable. Some of the following basic definitions of graph patterns are adapted from SPARQL, a standard RDF query language.

Definition 7 (Subscription Variable). A subscription variable is a member of the set V, where V is infinite and disjoint from $RDF_T$. A variable is represented by a preceding "?".

Definition 8 (RDF Triple Pattern). An RDF triple pattern is an RDF triple, where zero or more of the elements (i.e., subject, predicate and object) in the triple may be a variable. An example is (?x locatedIn CA), which indicates that some unknown individual ?x is located in California.

Definition 9 (Graph Pattern). A graph pattern is a set of triple patterns. An example is: GP1={(?call fromCust ?c), (?call toRep ?r), (?c locatedIn ?city), (?r locatedIn ?city), (?city rdf:type City), (?c locatedIn EastCoast), (?call durationInSec ?dur)}.

Definition 10 (Value Constraint). A value constraint is a boolean-valued expression of variables and RDF Terms. An example is: VC1={(?dur<500)}.

Definition 11 (Subscription). A subscription is the union of a graph pattern and a set of value constraints. An example is: S=GP1 $\cup$ VC1. FIG. 1 shows the subscription graphically.

Semantic Event-Subscription Match

We define an event-subscription match in terms of the existence of a substitution of variables in the subscription, such that the event can be used to derive the subscription, logically.

Definition 12 (Pattern Solution). A pattern solution is a substitution function (θ:V→RDF$_T$) from the set of variables in a graph pattern to the set of RDF terms.

For example, one possible definition of θ for the graph pattern, GP1 is: θ(?call)=call123, θ(?c)=Alice, θ(?r)=John, θ(?dur)=200, θ(?loc)=New York. The result of replacing a variable, v, in a graph pattern GP is represented by θ(v). The result of replacing all the variables in GP is written as θ(GP). Note that θ(GP) is an RDF graph, since all the variables have been replaced by RDF Terms.

Definition 13 (Event-Subscription Match). In any publish-subscribe system, an event matches a subscription if and only if all the conditions (or constraints) in the subscription are satisfied by the event. In our system, the event is represented by a graph containing OWL facts and all the conditions in the subscription are represented by a graph consisting of RDF triple patterns. Hence, if all the conditions in the subscription graph pattern can be satisfied by the event graph, the event satisfies the subscription.

A subscription, S, can be considered to be the union of a graph pattern and a set of value constraints. We represent this as S(GP, VC) where GP represents the graph pattern and VC represents the value constraint set. We define an event, E, to match a subscription, S(GP, VC), based on an ontology O, if and only if there exists a pattern solution, θ, such that the following conditions hold:

E∪O|=θ(GP) where |= is a logical entailment relation defined between RDF graphs. In other words, we try to see if it is possible to infer the substituted graph pattern from the event according to some well defined logical reasoning framework.

For every value constraint c∈VC, θ(c) is true, where θ(c) is the Boolean-valued expression obtained by substitution of variables in c.

Our definition of event-subscription matching makes use of logical reasoning to determine if it is possible to derive the subscription graph pattern, after some substitution of the variables, from the event graph. Since all events and subscriptions are based on a common ontology, O, the definitions in the ontology can also be used in the inference process. We also assume that the ontology does not satisfy the subscription on its own; otherwise, any event will trivially match the subscription.

The use of reasoning helps make the matching process much more powerful, since events can be matched to subscriptions even if they use different terms of graph structures. Since we use OWL to represent the ontology and the events, the exact kind of reasoning that may be employed is some flavor of DL (e.g., OWL-DL, OWL-Lite or OWL-DLP). For example, our system can match the event to the subscription in FIG. 1. To do so, the system makes use of domain knowledge in ontologies as well as reasoning. Further details regarding how this matching is done will be discussed under the heading Reasoning and Event Expansion.

Architecture

Figure 3:
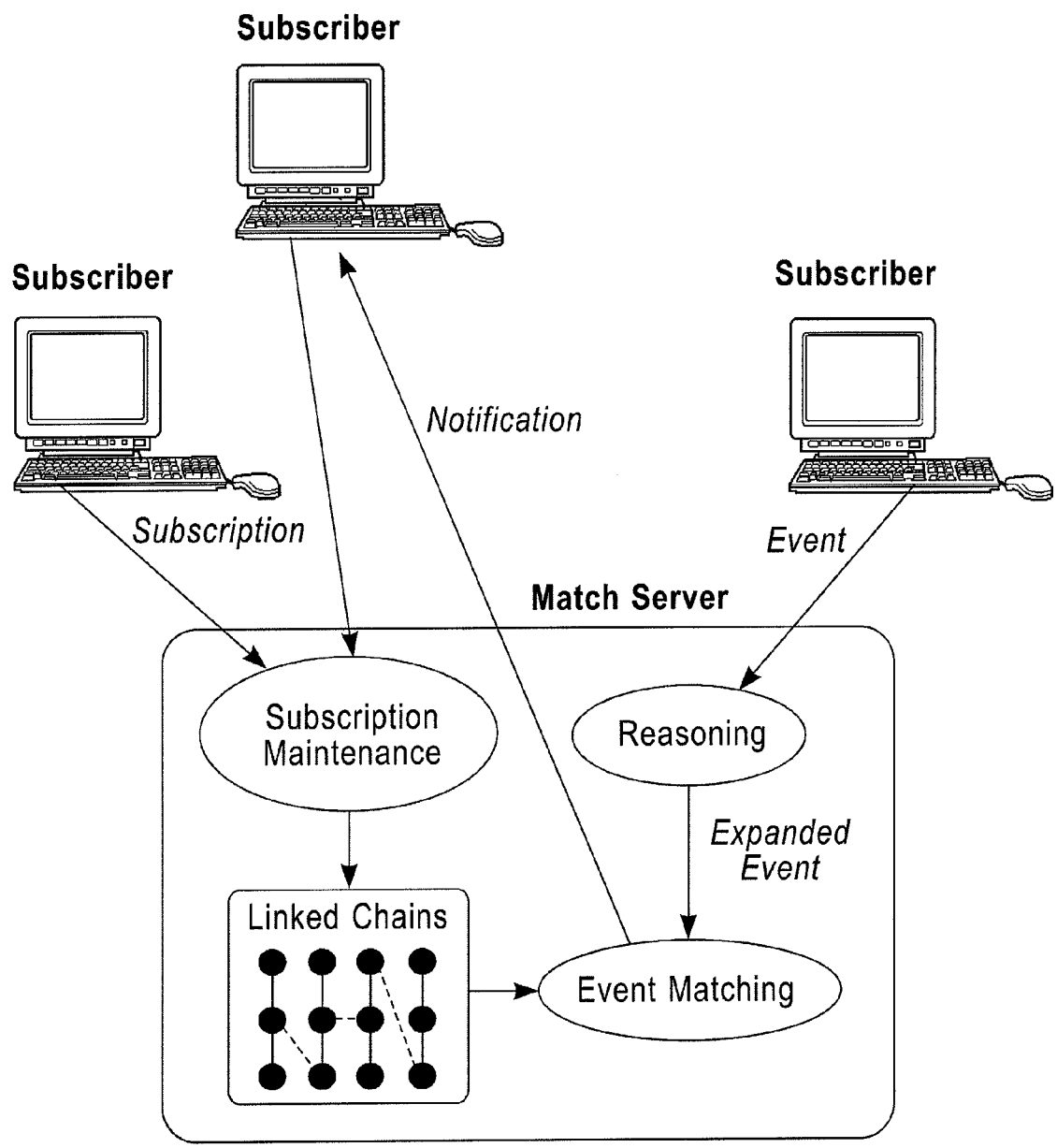
FIG. 3 shows a semantic publish-subscribe system according to an exemplary embodiment of the present invention.

The architecture of our system is shown in FIG. 3. The system consists of multiple subscribers and publishers, as well as an event match server (in short, server). Users can submit subscriptions or publish events to the server at any time. The server contains all the existing subscriptions and matches the incoming events against them. Upon receiving an event, the server first uses a DL reasoner to infer new facts and expand the event. The expanded event is matched against the existing subscriptions using an algorithm based on a linked-chains data structure. The server then notifies those subscribers whose interests match the event.

The event matching process in the system is as follows. At any point in time, let there be m subscriptions in the system, denoted by $s_1, s_2, \ldots s_m$. For each newly published event, e, the match server performs the following steps:

It expands the event e using the reasoner and the ontologies to produce the expanded event, e'.

For each subscription, $s_i$, i=1 ... m, it tries to discover a possible assignment of all variables in the subscription so that the substituted graph patterns are satisfied by e'.

The above architecture is motivated by the need to handle a large number of concurrent events and subscriptions. For this purpose, we seek to minimize the processing time of the even matching by extensive reuse of intermediate results. First, we separate event reasoning from matching, so that we only need to perform the expensive reasoning operation once. The same expanded event is then matched to all subscriptions. Note that there exists an alternative approach where event reasoning and matching are performed together; however, it suffers from the drawback of repeated reasoning for every subscription. Second, we reuse the evaluation results for those common triple patterns that are shared by multiple subscriptions. This is achieved by the linked-chains data structure. Based on the selectivity of the triple patterns, a chain ordering technique was developed to further reduce the expected matching overhead.

In what follows, we describe how reasoning and event expansion are performed and how an expanded event is matched to a subscription.

Reasoning and Event Expansion

With the previously defined semantic matching criteria, reasoning is needed to decide if an event matches a subscription. In the semantic publish-subscribe system, the reasoning is based on a type of DL, called OWL-DLP (Description Logic Programs) described in B. Grosof, I. Horrocks, R. Volz, and S. Decker. Description logic programs: combining logic programs with description logic. In Proc. International World Wide Web (WWW) Conference, pages 48-57, 2003, a copy of which is incorporated by reference herein in its entirety. OWL-DLP is an expressive sub-language of OWL-DL on which reasoning is known to be sound, complete and decidable, and can be performed in polynomial time. Reasoning is done using the logic rules defined for DLP as follows;

$$E' = E \cup \{t : E |-_{DLP}^{O} t\}$$

where E is the original event, O is the ontology, and $|-_{DLP}^{O}$ is the logical derivation process of applying DLP logic rules recursively on the triples in E, based on definitions in O, to obtain additional triples about the individuals in E, until a fix point is reached.

The outcome of the reasoning process, E', is called an expanded event. Intuitively, an expanded event is composed of not only the original event but also a new set of triples resulting from the reasoning. These newly added triples describe further information about the individuals defined in the event. For example, there are DLP rules that allow inferences based on subclass and subproperty relationships, symmetric, transitive and inverse property definitions, domain and range definitions, value restrictions, etc. Based on these rules we can infer many facts that are not contained in the original event. Note that we only include additional triples that describe individuals in the original event as these are the most relevant for matching to a subscription.

Figure 4:
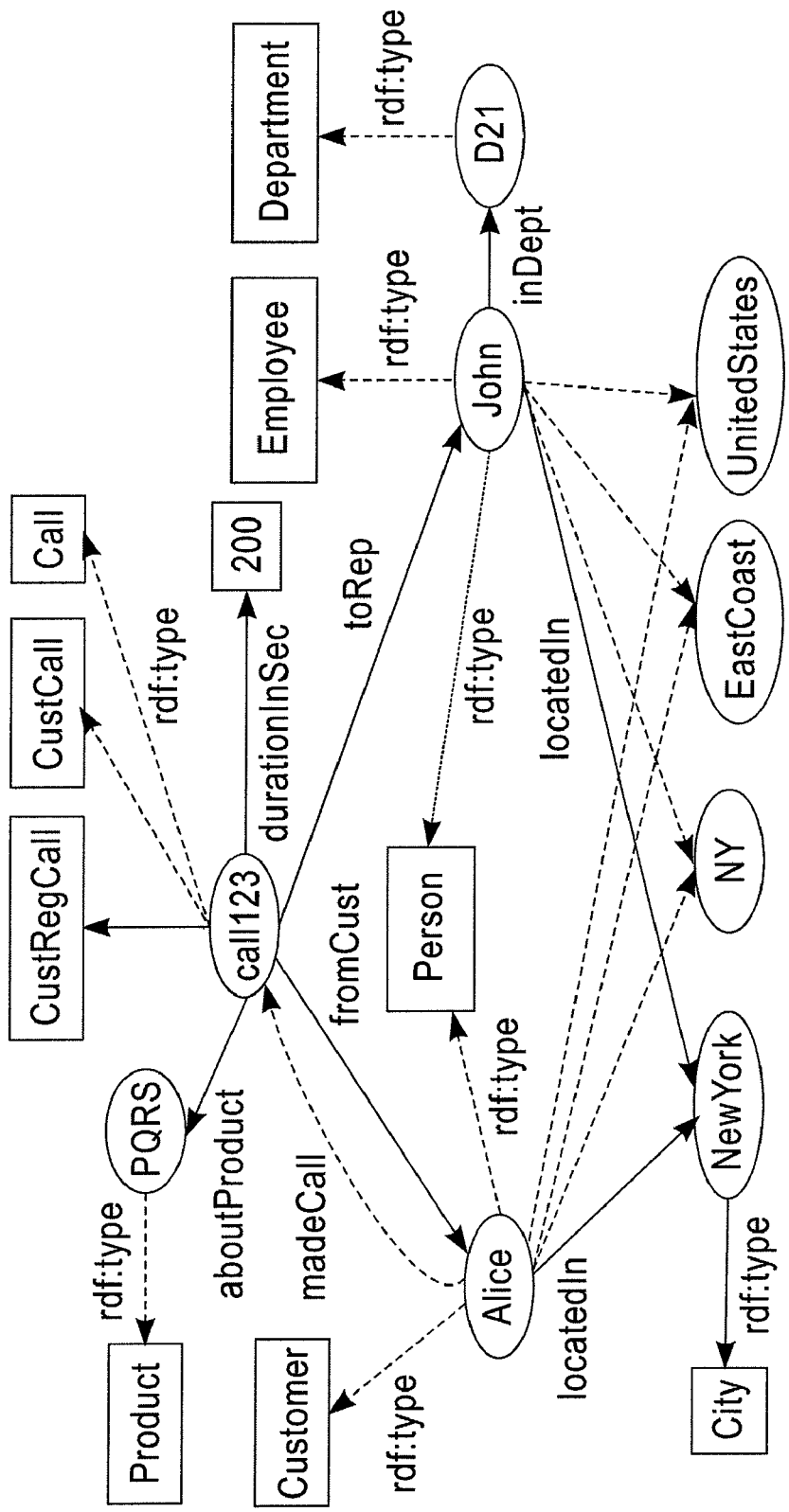
FIG. 4 shows a portion of the event of FIG. 1 expanded according to an exemplary embodiment of the present invention.

For example, consider the event in FIG. 1. In the ontology, CustRegCall is defined as a subclass of CustCall, which in turn is a subclass of Call. The individual NewYork is defined to be locatedIn the individual NY; and locatedIn is defined as a transitive property. In addition, the property fromCust is defined as the inverse of madeCall, and the range of fromCust is defined to be Customer, which is a subclass of Person. Based on such ontology knowledge, some of the reasoning results include (call123 rdf:type CustCall), (Alice rdf:type Customer), (Alice locatedIn NY), (Alice madeCall call123) and (John locatedIn NY). A portion of the expanded event is shown in FIG. 4.

In our system, the event reasoning is implemented using Minerva as described in J. Zhou, L. Ma, Q. Liu, L. Zhang, Y. Yu, and Y. Pan. Minerva. A scalable owl ontology storage and inference system. In Proceedings of the $1^{st}$ Asian Semantic Web Symposium, 2004, a copy of which is incorporated by reference herein in its entirety, which is a scalable and efficient DLP reasoner that uses a backend relational database to store the ontologies and all inferred facts. A key feature of Minerva is that it allows efficient assertion and retraction of ABox facts with the help of a rule engine. Thus, one can add new individuals, type assertions and property assertions to the knowledge base, and Minerva can efficiently compute all new facts that can be inferred from the assertions. It is this feature that is exploited to expand the event. The worst-case time complexity for performing the DLP reasoning is polynomial in the number of facts in the original event and the associated portions of the ontology. In practice, the events typically have only a small number of triples. Thus, the reasoning time can be bounded by a constant.

Matching One Expanded Event to One Subscription

Now we consider the basic case of matching one event to one subscription. With the expanded event at hand, the matching operation can be reduced to a subgraph comparison. Consider the subscription S=(GP, VC), where GP is the set of graph patterns and VC is the set of value constraints. The expanded event E' matches subscription S if and only if there exists a pattern solution $\theta$ such that:

$\theta$ (GP) is a sub-graph of E':

For every value constraint $c \in VC, \theta(c)$ is true.

In the above-formulations, both graphs $\theta$ (GP) and E' are represented as sets of triples. It is easy to see that $\theta$ (GP) is a subgraph of E' if and only if $\theta$ (GP) $\subset$ E'. In other words, for every triple t, the following condition holds: $t \in \theta(GP) \Rightarrow t \in E'$. This way, the event matching problem is reduced to the problem of finding one variable assignment for the subscription such that the substituted graph patterns are a subset of the expanded event, and all substituted value constraints evaluate to true.

Specifically, let $\{tp_i, i=1 \ldots 1\}$ denote the set of triple patterns in the subscription. These triples patterns are evaluated one by one. For each triple pattern $tp_i$, we find a candidate solution set (i.e., feasible variable substitutions), denoted by $\{\theta_{i,j}, j=1 \ldots r_i\}$, where $r_i$ is the number of such solutions. Each solution $\theta_{i,j}$ maps the variables in $tp_i$ to RDF terms in the expanded event E', i.e., $\theta_{i,j}(tp_i) \subset E'$. Note that each solution may assign values to one, two or three variables, depending on the specific form of $tp_i$, because each triple pattern must have at least one variable but at most three variables.

Given that the subscription has 1 triple patterns, we can obtain 1 sets of candidate solutions, one for each triple pattern. Next we construct one set of combined candidate solutions, which satisfy all the triple patterns. This is done by taking the union of individual candidate solutions if they do not share variables, or an inner join if the do. Any variable assignments from one triple pattern that do not satisfy other triple patterns will be deleted. Let the resulting set of combined candidate solutions be $\{\Theta_j, j=1 \ldots t\}$, where t is the number of such solutions. Each solution $\Theta_j$ maps all the variables in the subscription and satisfies every triple pattern in the subscription. For the expanded event in FIG. 1, there is only one combined candidate solution: $\Theta_j = \{(?call=call123), (?c=Alice), (?r=John), (?dur=200), (?loc=NewYork)\}$.

Finally, we test the combined candidate solutions against the value constraints in the subscription. For each combined candidate solution $\Theta_j$ and each value constraint $c_i$, we check whether $\Theta_j(c_i)$ is true. If there exists one combined candidate solution that satisfies all the value constraints, then it becomes the final solution, and the original event matches the subscription. Otherwise, the event does not match the subscription. In this example, the combined candidate solution $\Theta$ does satisfy the value constraint (?dur<500) and hence, the event matches the subscription.

Efficient Matching Algorithm

One critical issue in publish-subscribe systems is how long it takes to match an event to a large number of subscriptions, which directly impacts the system scalability. In order to reduce the expected event processing time, our system uses an efficient matching algorithm based on a linked-chains data structure and a chain ordering technique. The basic idea is to exploit the overlaps among the subscriptions and avoid redundant computation whenever possible. In the following, the matching algorithm will be presented in detail.

Linked-chains Data Structure

In a publish-subscribe system many subscriptions may share one or more triple patterns. To optimize the matching process, we can reuse the intermediate evaluation result across such overlapping subscriptions. As an example, consider the case where the system has the following four subscriptions:

$s_1 = \{$(?cr withCustomer ?x), (?cr rdf:type CustReg), (?x rdf:type Man), (?x locatedIn US), (?x hasAge ?y), (?y<50)$\}$ $s_2 = \{$(?cr withCustomer ?x), (?cr rdf:type CustReg), (?x rdf:type Man), (?x hasProfession NeuroSurgeon), (?x hasAge ?y), (?y>60)$\}$ $s_3 = \{$(?cc withCustomer ?x), (?cc rdf:type CustCancel), (?x rdf:type Person), (?x locatedIn US), (?x studiedIn MIT)$\}$ $s_4 = \{$(?cc withCustomer ?x), (?cc rdf:type CustCancel), (?x rdf:type Person), (?x hasProfession NeuroSurgeon)$\}$ In this example, if we first evaluate $s_1$ and find possible candidate solutions for triple pattern (?cr withCustomer ?x), we can reuse these solutions for other subscriptions. In addition, if an event does not have any feasible solutions for this triple pattern, we can immediately discard all subscriptions that contain it, without evaluating the rest of the triple patterns in these subscriptions. Such evaluation sharing can greatly reduce the number of triple patterns that are actually evaluated during the matching process.

In order to facilitate the reuse of triple pattern evaluation across multiple subscriptions, we introduce an efficient data structure called linked-chains. In linked-chains, each subscription is represented as a chain of triple patterns, and links between chains represent common triple patterns shared by multiple subscriptions. An important point to note is that the variables used by different subscriptions are independent. As such, even if they have same name (e.g., ?x), they are not necessarily bound to the same value in all subscriptions. Therefore, we must normalize the variables so that different subscriptions have different variable names. This is done by appending the subscription index to all variable names. In the example shown above, the normalized subscriptions are:

$s_1 = \{$(?cr1 withCustomer ?x1), (?cr1 rdf:type CustReg), (?x1 rdf:type Man), (?x1 locatedIn US), (?x1 hasAge ?y1), (?y1<50)$\}$ $s_2 = \{$(?cr2 withCustomer ?x2), (?cr2 rdf:type CustReg), (?x2 rdf:type Man), (?x2 hasProfession NeuroSurgeon), (?x2 hasAge ?y), (?y2>60)$\}$ $s_3 = \{$(?cc3 withCustomer ?x3), (?cc3 rdf:type CustCancel), (?x3 rdf:type Person), (?x3 locatedIn US), (?x3 studiedIn MIT)$\}$ $s_4 = \{$(?cc4 withCustomer ?x4), (?cc4 rdf:type CustCancel), (?x4 rdf:type Person), (?x4 hasProfession NeuroSurgeon)$\}$ After normalizing the variable names, we insert the subscriptions into the linked-chains as follows. For any subscription, we create a chain of nodes, where each node represents a triple pattern in this subscription, and the nodes are arranged in decreasing order of selectivity. Here the selectivity is defined as the inverse of the probability that an event satisfies this triple pattern (i.e., there exists at least one feasible variable assignment for this triple pattern). In other words, a highly selective triple pattern has a low probability of being satisfied by an event. By ordering the triple patterns in the decreasing order of selectivity, we can reduce the expected number of nodes that we have to evaluate if the event does not match the subscription. The selectivity of a triple pattern can be obtained in a number of ways, for example, by checking the matching results of past events.

Figure 5:
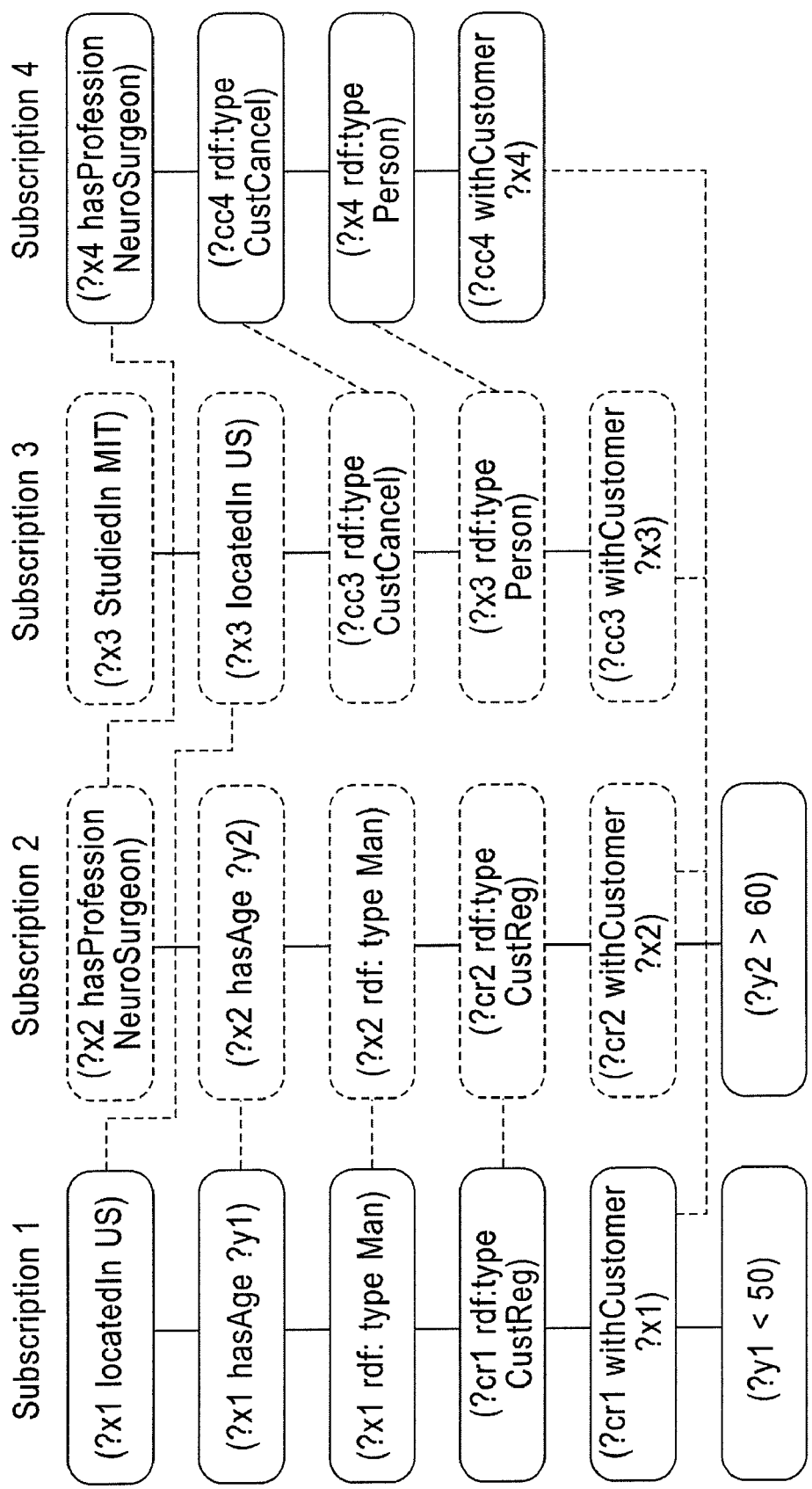
FIG. 5 shows a linked-chains structure constructed for four subscriptions according to an exemplary embodiment of the present invention.

When there are multiple subscriptions, each subscription has its own chain. Two nodes on different chains are linked if their triple patterns are equivalent, in other words, their subject, predicate and object fields are either the same or variables that can be unified. For example, (?x1 p ?y1) is equivalent to (?x3 p ?y4), but it is not equivalent to (?x7 p ?x7) because the last triple patterns require the subject and the object to have the same value. As an example, FIG. 5 shows a linked-chains structure constructed for the four subscriptions described earlier.

A feature of a linked-chains structure is to ensure that a triple pattern is evaluated only once even if it appears in multiple subscriptions. This is because the equivalence links make it easy to reuse the evaluation results of such shared triple patterns. Note that the equivalence links can occur across different chains or even inside one chain (when a subscription has two equivalent triple patterns).

Subscription Maintenance

In practice, new subscriptions can arrive in the system and old subscriptions can expire at any time. To handle such subscription dynamics, the linked-chains structure needs to be maintained. In what follows, we describe the details of such maintenance process.

Inserting a subscription. When a new subscription arrives in the system, the linked-chains structure is updated in the following steps:
1. Create a chain for the new subscription, where the nodes are ordered from top to bottom in decreasing order of selectivity.
2. For each node of the new chain, find an equivalent node (i.e., equivalent triple pattern) in the existing chains. If any equivalent node is found, create a link between the two nodes. This operation can be done efficiently by maintaining a hash-table of all existing triple patterns.
3. Use the chain ordering algorithm, which will be described later under the heading Chain Ordering, to decide where the new chain is inserted in the linked-chains structure.

Deleting a subscription. When an existing subscription is deleted, the corresponding chain is removed and any links from a node on this chain are also removed.

Event Matching Over Linked-chains

When a new event is published, it is matched against the subscriptions in the linked-chains structure as follows. The subscriptions are first inserted into a queue in a natural order (i.e., from left to right). At each step, we evaluate the first subscription in the queue, until the queue becomes empty. For a given subscription,
1. Evaluate the nodes on the corresponding chain from top to bottom. For each node, check it against the event and find all possible solutions for the variables in this triple pattern. The solutions are in the form of a set of singletons, pairs or triples, depending on how many variables the triple pattern has.

(a) If no solution is found, discard the currently evaluated subscription and move on to the next subscription. Moreover, all subscriptions that have equivalence links to this node are also discarded from the queue, if they have not yet been evaluated.
   (b) If there are one or more solutions, propagate the solutions to all nodes that have equivalence links to this node. Mark those nodes as "evaluated", so that they will not be evaluated again.
2. Calculate the combined candidate solutions for all triple patterns as previously described, and then, check the value constraints. The combined solutions are in the form of tuples corresponding to possible assignments to different variables in the subscription. If there exists at least one valid combined solution, then the event matches the subscription.

Modeling of Evaluation Cost

Note that the matching process over linked-chains is guaranteed to be correct (i.e., finding all subscriptions that match the event), regardless of the order by which the chains are evaluated. However, such an order for the chains does have an impact on the matching efficiency. For example, one can reduce the evaluation cost by first evaluating the highly selective triple patterns, so that many subscriptions can be directly discarded. In order to decide the optimal chain order, an analytical model was developed for the evaluation costs.

Cost of evaluating one triple pattern One way of evaluating a triple pattern is to compare it against all triples in the expanded event, one at a time. Let $n_e$ be the number of triples in the event. Thus, the evaluation cost for one triple pattern is $O(n_e)$. However, we can reduce the complexity by using efficient data structures, such as hash tables, to represent the events. For a given event, such a hash table is indexed by the unique predicates in all triples. For each index, the value stored in the hash table is the set of triples that have the corresponding predicate. We can further hash this set of triples into two hash tables, one indexed by the subjects and the other indexed by the objects. As such, we can find all triples that can potentially match a given triple pattern in O(1) time. In what follows, we normalize the cost of evaluating one triple pattern as one unit.

Cost of evaluating a single chain. Let us now consider the expected cost of evaluating a single subscription, which has n triple patterns. The probability that the i-th triple pattern is satisfied is denoted by $p_i$. As described before, the nodes are ordered in an increasing order of $p_i$.

Note that the first node on the chain is always evaluated. However, the second node is evaluated only when the first node is satisfied. Thus, the probability of evaluating the second node is $p_i$. Similarly, the probability of evaluating the k-th node ($1 \leq k \leq n$) is $$\prod_{i=1}^{k-1} p_i.$$

Hence, the total cost of evaluating this chain is $$C = 1 + p_1 + p_1 p_2 + \ldots + \prod_{i=1}^{n-1} p_i = 1 + \sum_{i=1}^{n-1} \prod_{j=1}^{i} p_j$$

Cost of evaluating two chains. Now consider the expected cost of evaluating two subscriptions, $s_1$ and $s_2$, where $s_1$ has m triple patterns and $s_2$ has m triple patterns. Let $p_{1,i}$ and $p_{2,j}$ be the selectivity of i-th triple pattern in $s_1$ and j-th triple pattern in $s_2$, respectively. If there are no equivalence links across $s_1$ and $s_2$, then the cost of evaluating these two subscriptions is $$C = C_1 + C_2 = 1 + \sum_{i=1}^{n-1} \prod_{j=1}^{i} p_{i,j} + 1 + \sum_{i=1}^{m-1} \prod_{j=1}^{i} p_{2,j}$$

Now assume there is only one equivalence link between $s_1$ and $s_2$. Without loss of generality, assume this link is between node $n_{1,a}$ and $n_{2,b}$ where $1 \leq a \leq n$ and $1 \leq b \leq m$. There are two possibilities in evaluating these two chains: a) evaluate $s_1$ first; or b) evaluate $s_2$ first. In the first case, we can utilize the equivalence link if and only if all nodes above $n_{1,a}$ in $s_1$ are satisfied. If this condition holds, then node $n_{1,a}$ will be evaluated and the solutions are propagated to node $n_{2,b}$. Moreover, if no solution is found for $n_{1,a}$, then we do not need to evaluate any triple pattern in $s_2$. Hence the expected cost of evaluating both subscriptions is:

$$C_{s_1 \to s_2} = \left[1 + \sum_{i=1}^{n-1} \prod_{j=1}^{i} p_{1,j}\right] +$$

$$\prod_{i=1}^{a} p_{1,i} \times \left[1 + \sum_{i \neq 1, i=b-1}^{m-1} \prod_{j \neq 1, j=b}^{i} p_{2,j}\right] + \left(1 - \prod_{i=1}^{a-1} p_{1,i}\right) \times \left[1 + \sum_{i=1}^{m-1} \prod_{j=1}^{i} p_{2,j}\right]$$

Similarly, if we evaluate $s_2$ before $s_1$, the expected evaluation cost is $$C_{s_2 \to s_1} = \left[1 + \sum_{i=1}^{m-1} \prod_{j=1}^{i} p_{2,j}\right] +$$

$$\prod_{i=1}^{b} p_{2,i} \times \left[1 + \sum_{i \neq 1, i=a-1}^{n-1} \prod_{j \neq 1, j=a}^{i} p_{1,j}\right] + \left(1 - \prod_{i=1}^{b-1} p_{2,i}\right) \times \left[1 + \sum_{i=1}^{n-1} \prod_{j=1}^{i} p_{1,j}\right]$$

Note that the equivalence link implies that $p_{1,a} = p_{2,b}$ (since the nodes are equivalent). Thus, we have $$C_{s_1 \to s_2} - C_{s_2 \to s_1} = (1 - p_{1,a}) \times (P_{2,b} \times C_{1,a} - P_{1,a} \times C_{2,b})$$

where $$P_{1,a} = \prod_{i=1}^{a-1} p_{1,i} \quad \text{and} \quad P_{2,b} = \prod_{i=1}^{b-1} p_{2,i}$$

are the probabilities that $n_{1,a}$ and $n_{a,b}$ are evaluated, respectively, while $$C_{1,a} = 1 + \sum_{i=1}^{a-2} \prod_{j=1}^{i} p_{i,j} \quad \text{and} \quad C_{2,b} = 1 + \sum_{i=1}^{b-2} \prod_{j=1}^{i} p_{2,j}$$

are the expected cost of evaluating all nodes above $n_{1,a}$ and $n_{a,b}$, respectively.

We can see that when $a=b=1$, there is no difference between $C_{s_1 \to x_2}$ and $C_{x_2 \to s_1}$. Otherwise, $C_{x_1 \to s_2} < C_{s_2 \to s_1}$ if and only if $$\frac{C_{1,a}}{P_{1,a}} < \frac{C_{2,b}}{P_{2,b}}$$

Intuitively, the C/P ratio represents the "normalized" cost of evaluating a chain up to the node where an equivalence link exists. The lower C/P ratio a chain has, the earlier it should be evaluated. In other words, we can advance to the equivalent node with the smaller expected cost. This way, the overall evaluation cost is minimized, because such equivalent nodes are where the evaluation costs can be saved.

Now consider a general case where k equivalence links exists between $s_1$ and $s_2$. The i-th equivalence link is between node $n_{1,i_1^i}$ on $s_1$ and node $n_{2,i_2^i}$ on $s_2$, where $1 \leq i \leq k$. We shall derive the cost difference in different evaluation orders, i.e., $C_{s_1 \to x_2} - C_{x_2 \to x_1}$. One key observation here is that in a linked-chains structure, two chains never cross. In other words, if there are two links, one between $n_{1,a}$ and $n_{2,b}$ yet the other between $n_{1,c}$ and $n_{2,d}$, then $a<c$ also implies $b<d$. The proof arises from the fact that on each chain, the nodes are arranged in decreasing order of selectivity. As such, $a<c$ implies that node $n_{1,a}$ is above $n_{1,c}$ and hence, $p_{1,a}<p_{1,c}$. Based on the equivalence links, we have $p_{1,a}=p_{2,b}$ and $p_{1,c}=p_{2,d}$. Therefore, $p_{2,b}<p_{2,d}$, which implies that $n_{2,b}$ is above $n_{2,d}$ or $b<d$.

Using a similar approach as before, we can derive the difference in expected evaluation costs as:

$$C_{s_1 \to s_2} - C_{s_2 \to s_1} = \sum_{i=1}^{k} (1 - p_{1,i_i})[P_{2,i_2^i} \times C_{1,i_1^i} - P_{1,i_1^i} \times C_{2,i_2^i}]$$

where $C_{s,i}$ and $P_{s,i}$ are defined in the same way as before.

Chain Ordering

Given the above evaluation cost model for a pair of subscriptions, we can derive the optimal order for multiple subscriptions as follows. Suppose, for example, that the system has M subscriptions in total. For each pair of subscriptions, we can calculate the cost difference between the two possible orders. In total, we have M×(M−1) such pair-wise cost differences. Given these cost differences, the next problem is to determine the optimal order for all chains, such that the overall cost saving is maximized.

This problem can be reduced, for example, to the Traveling Salesman Problem, which is NP-complete. To solve this problem, we used a simple greedy heuristic, based on Kruskal's algorithm. Specifically, we construct a complete graph (V,E) and a weight function W:E→R. Each node in V corresponds to one chain (i.e., subscription) in the linked-chains structure, and the weight of an edge (u,v) is the cost difference of evaluating u before v, as compared to evaluating v before u. To find the optimal order, our algorithm performs the following steps:

1. Sort the edges in the increasing order of weights.
2. At each step, start from the least-weight edge and check the remaining edges one-by-one. Pick tip an edge if and only if the edge, together with already selected edges,
   a. does not cause a vertex to have degree three or more; and
   b. does not form a cycle, unless the number of selected edges equals the number of vertices in V.

The output of this algorithm is a set of edges that cover the vertex set V in a non-cyclic manner and with the least cost.

This set of edges uniquely defines an order for the chains in the linked-chain structure. For example, if an edge (u,v) is chosen, then u should be evaluated before v. In other words, in the linked-chain structure, the chain corresponding to u appears before the chain corresponding to v.

Performance Evaluation

Our semantic publish-subscribe system was implemented and evaluated in a small testbed. The experimental results show that the system can match semantic-rich events and subscriptions in an efficient and scalable manner. In the following, we briefly describe the evaluation methodology and report the experimental results.

Evaluation Methodology

The goal of the experiments is to evaluate the effectiveness and efficiency of the system, which can be quantified through the following two metrics:

Recall: For a given subscription, how many relevant events can the system identify out of the published ones?

Processing Time: How much time does it take to process an event or a subscription?

To answer these questions, we conducted experiments using a Linux server with Xeon 3.4 HHz CPU and 1 GB memory. During the experiments, we first generated multiple random data sets, each of which has 20K events and 20K subscriptions, and then, these data sets were fed into the system. The events and subscriptions were based on a disaster-relief ontology. The results reported were based on the average over multiple runs. In order to control the complexity of these subscriptions and events, our data generation process used two important parameters, namely, MaxNumInstance and MaxNumProperty. The former dictates the maximum number of instances and variables that can appear in each event or subscription, while the latter controls the maximum number of properties that can be associated with each instance. Note that these upper bounds only apply to raw events, and many more triples (that possibly contain additional instances and properties) will be inferred during the reasoning process and appended in the expanded form of the events. In what follows, we will use $Sub_{i,j}$ and $Pub_{i,j}$, respectively, to denote the subscription set and event set generated with MaxNumInstance as I and MaxNumProperty as j.

For comparison purposes, we implemented a baseline matching algorithm, called Native, that matched the events against the subscriptions one by one. Note that our matching algorithm has two essential components: the linked chain structure and chain ordering. To evaluate their respective benefits, we implemented a variant of this, called LinkedChain, which used the linked chain structure without chain ordering. The full version of our algorithm is called SortedLC.

Experimental Results

Recall. Recall was evaluated by the number of matching events that the system could identify for a given subscription. During these experiments, we first disabled the description logic reasoning and recorded the average number of matching events for one subscription, then we turned on the reasoning module and re-ran the experiments with the same datasets. For fair comparison, we fixed the subscriptions as those in set $Sub_{3,3}$ and fed different event sets into the system. The results are shown below in Table 1.

TABLE 1

| Dataset | With reasoning | Without reasoning | Ratio |
|---|---|---|---|
| $Pub_{3,3}$ | 5755.6 | 126.1 | 45.64 |
| $Pub_{3,5}$ | 5745.5 | 123.2 | 46.63 |

TABLE 1-continued

| Dataset | With reasoning | Without reasoning | Ratio |
|---|---|---|---|
| $Pub_{5,3}$ | 5769.6 | 272.8 | 21.26 |
| $Pub_{5,5}$ | 5770.1 | 362.5 | 15.92 |

As can be seen, the reasoning can greatly improve the recall of our system. For example, in the case of event set $Pub_{3,3}$ that has 20000 events in total, the reasoning on these events can improve the number of matching events from 126 to 5755, which is a 45-fold increase. This is because many events are semantically relevant to a given subscription, yet unfortunately described in a different manner from what the subscription does. Therefore, if one directly matches these raw events against the subscriptions, such relevant events would be missed.

Another observation that we can make from Table 1 is that as the complexity of the raw events increases, the number of matching events goes up when reasoning is turned off, yet is fairly stable when reasoning is turned on. This is because the more complex events encode more information in themselves, and thus are more likely to match the subscriptions. However, such information never exceeds that in the ontology, which is used to generate those events and subscriptions, thus not affecting the expanded events after reasoning is applied.

Event Processing

Figure 6:
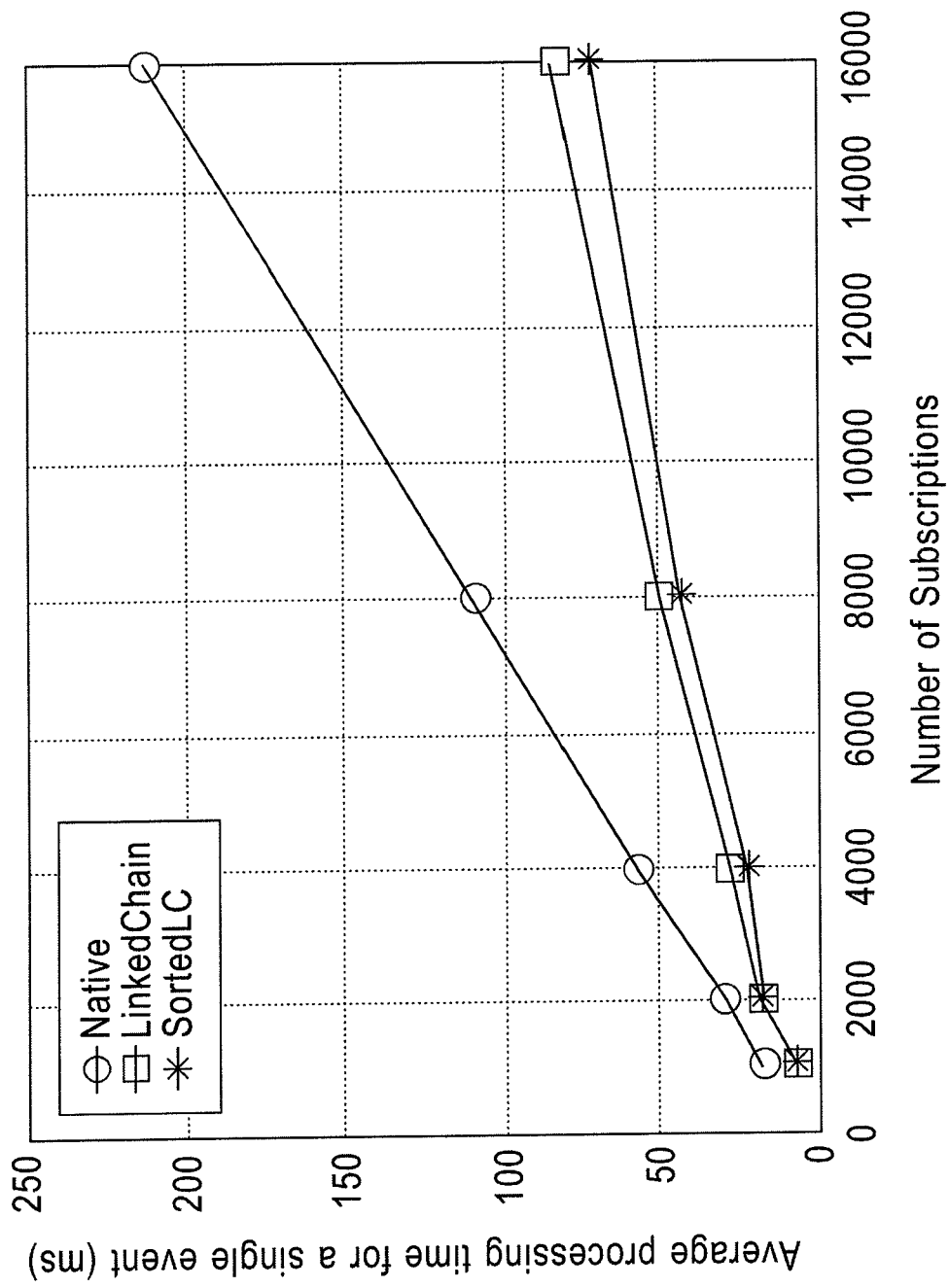
FIG. 6 shows average processing times for one event that were incurred by a conventional matching algorithm, and two matching algorithms according to exemplary embodiments of the present invention.

We conducted several experiments to evaluate the processing overhead of event matching in the first set of experiments, we fixed the event set as $Pub_{3,5}$ and loaded different numbers of subscriptions, ranging from 1000 to 16000, from $Sub_{3,5}$ into the system. We compared, the average processing time for event incurred by different matching algorithms. The experimental results are plotted in FIG. 6.

It can be seen that both LinkChain and SortedLC are much more efficient than the Native algorithm. This shows their common mechanism, the linked chain structure, is very effective in reducing the processing overhead of event matching. For example, with 8000 subscriptions, it takes 166.8 ms to produce one event using Native, in contrast to 49.7 ms and 44.6 ms with LinkedChain and SortedLC, respectively. In fact, as the processing overhead with Native increases linearly with respect to the number of subscriptions, the linked chain structure can achieve sub-linear increases in processing time. In addition, the chain ordering algorithm in SortedLC further reduces the processing time as compared to LinkedChain by up to 10%.

Figure 7:
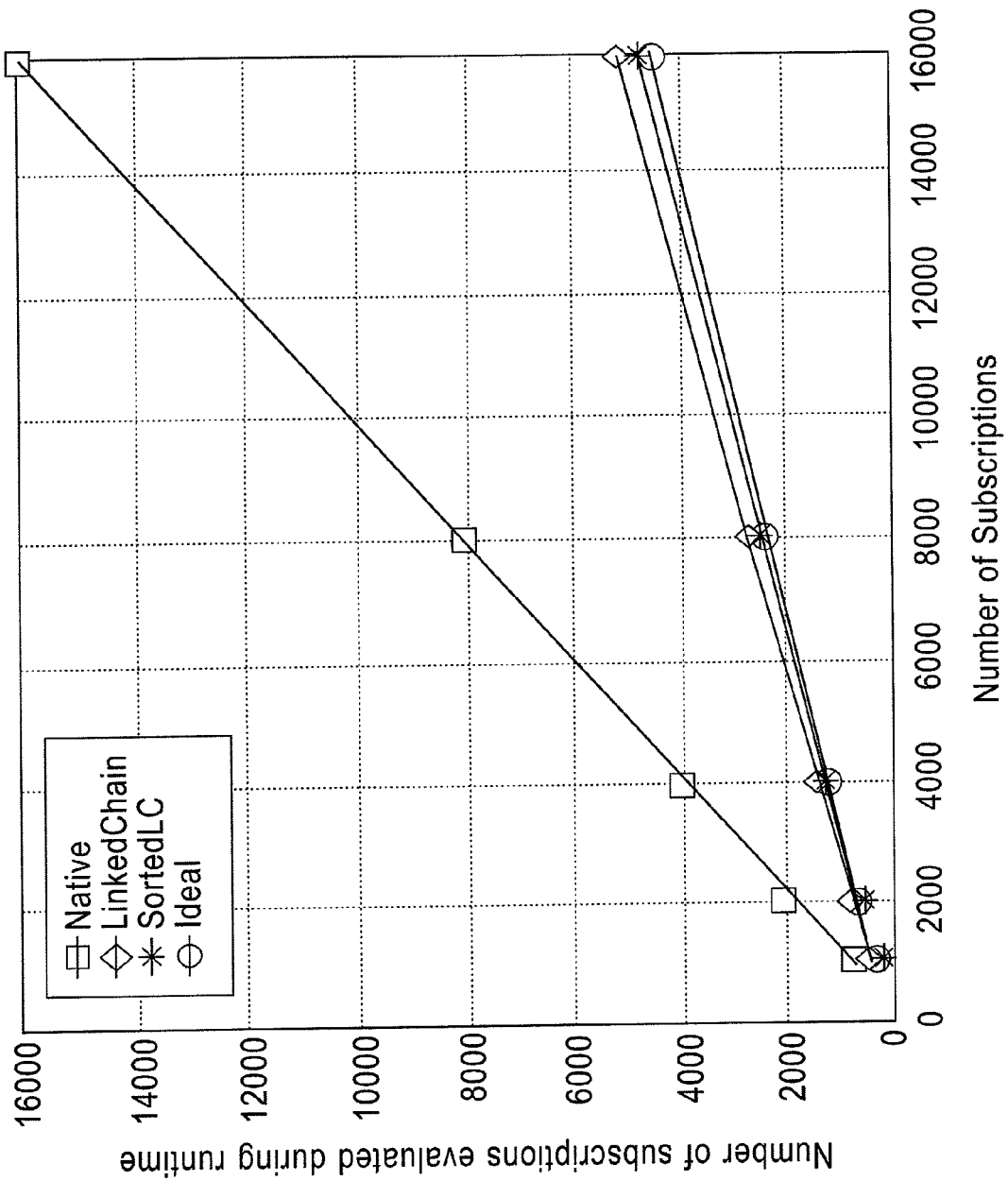
FIG. 7 shows an actual number of subscriptions that were evaluated during runtime by the algorithms of FIG. 6.
Figure 8:
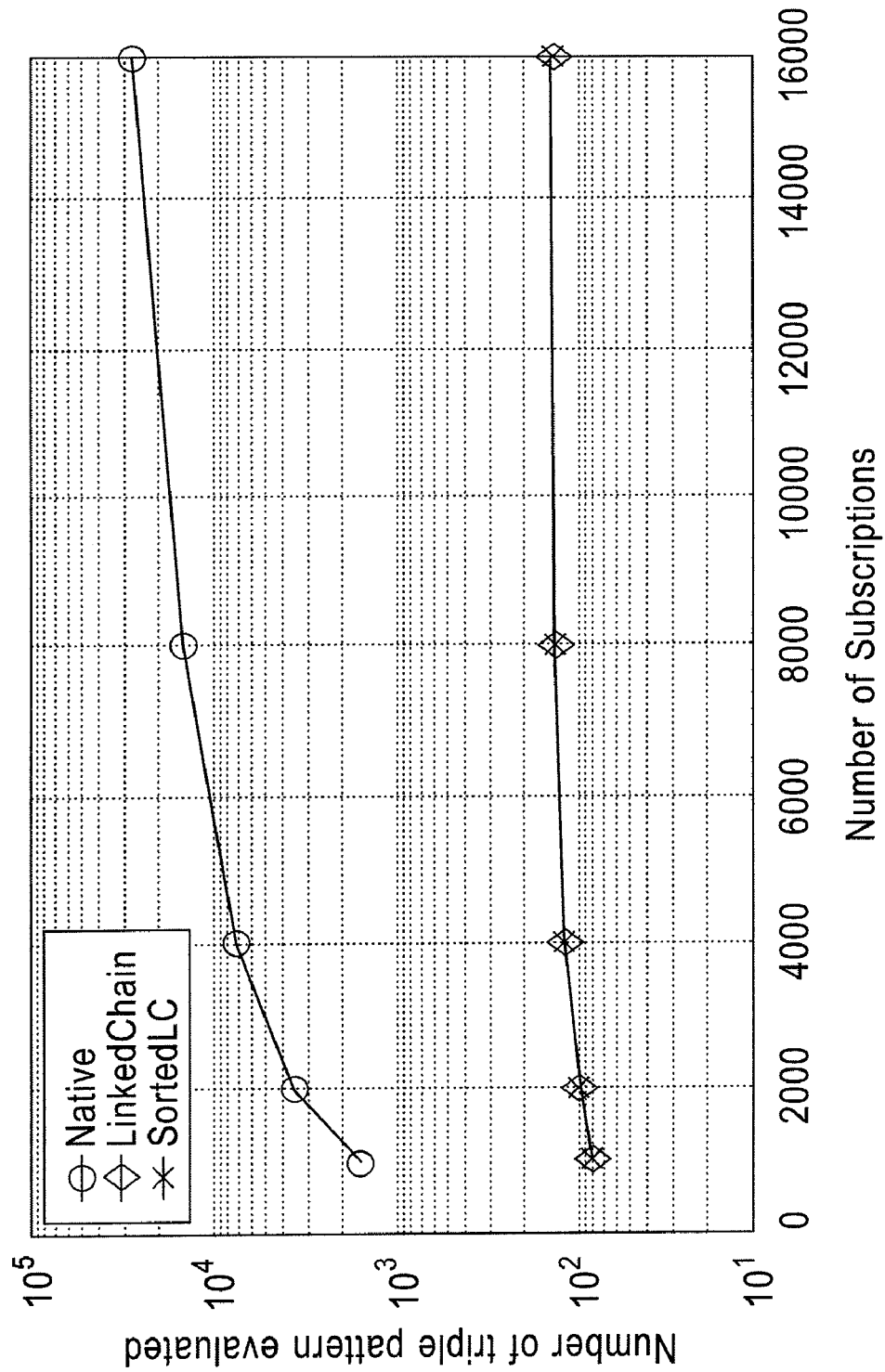
FIG. 8 shows an actual number of triple patterns that were evaluated during runtime by the algorithms of FIG. 6.

To understand why the ordered and linked chains can reduce the processing overhead, we analyzed the traces obtained from the above experiments, and we found the actual number of subscriptions and triple patterns that were evaluated in runtime with the different algorithms (shown in FIGS. 7 and 8, respectively).

From FIG. 7 we can see that with the ordered and linked chains, only a small fraction of subscriptions are evaluated in runtime as compared to the Native case, where each and every subscription is evaluated. This is due to the effect of propagating negative results across the chains. Specifically, when we evaluate a subscription and find no solution for one of its triple patterns, ail other remaining subscriptions that contain the same triple pattern are immediately invalidated and removed from the queue.

In FIG. 7, we also plotted the number of identified matching events in each experiment as the baseline (i.e., the curve name "Ideal"). Clearly, no matching algorithm can evaluate less events than the number of actual matching events. Thus, as shown in FIG. 7, the performance of our algorithms is quite close to the ideal case.

FIG. 8 gives us a more detailed view of how many triple patterns are actually evaluated in runtime. It shows that the ordered and linked chains can reduce the triple pattern overhead by orders of magnitude. This saving is due to not only the aforementioned propagation of negative results, but also the propagation of positive results across the chains. In other words, if multiple subscriptions share the same triple pattern, only the first occurrence is evaluated and the result is propagated to other subscriptions.

Figure 9:
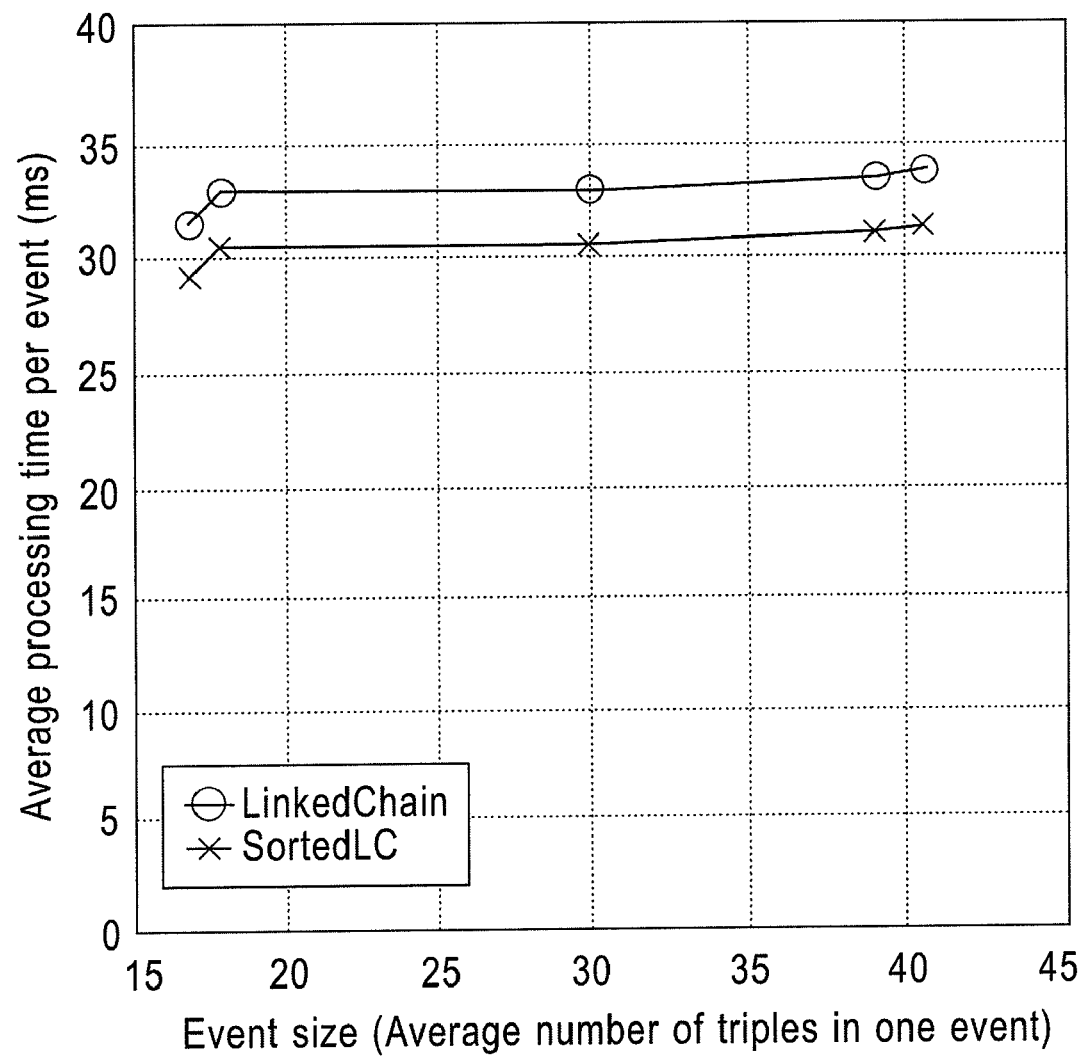
FIG. 9 shows an average per-event processing time versus event size for the two matching algorithms according to exemplary embodiments of the present invention of FIG. 6.

Next, we studied how the event matching overhead changes as the events become more complicated. During these experiments, we fixed the subscription set as $Sub_{3,5}$ and loaded different events into the system. FIG. 9 plots the average per-event processing time versus the event size, which is represented by the number of triples in the expanded event. We can see that our system can handle complex events well, as the processing time is fairly stable as the event size grows. The is because of the extensive use of hash tables in implementing the data structure for the events. As a result, the overhead of verifying the existence of any triples, or retrieving a given triple, is constant regardless of the event size.

In accordance with an exemplary embodiment of the present invention, the use of semantic graphs to described events and subscriptions allows us to represent complex inter-relationships between different entities in an event or a subscription. In addition, the use of description logic reasoning, together with domain knowledge in ontologies can help match events to subscriptions even if they use different terms or graph structures. Further, in our system, all parties use a common set of domain ontologies, which are written in OWL. Thus, events and subscriptions have well defined and clear semantics. This helps reduce the possibility of ambiguity in what an event and a subscription really means and helps increase interoperability across different publishers and subscribers. The ontologies also help establish a common schema for all parties, which is an important concern in large-scale publish-subscribe systems.

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A semantic publish-subscribe system, comprising:
a plurality of subscribers;
a plurality of publishers; and
a server that includes a memory device for storing a program and a processor in communication with the memory device, wherein the server receives and stores subscriptions that are described in web ontology language (OWL) graph patterns from the plurality of subscribers and receives events that are described in semantic graphs formed by OWL assertions from the plurality of publishers,
wherein when the server receives an event from a publisher, the server expands the OWL assertions of the event using a reasoner to produce an expanded event, the server matches the expanded event to a subscription, and then, the server notifies a subscriber whose interest matches the event, and
wherein the subscriptions are stored in a linked-chains structure by,
creating a chain of nodes for each subscription, wherein for each subscription each node in the chain of nodes represents a triple pattern in the subscription;
arranging the nodes in each chain of nodes in a decreasing order of selectivity, wherein nodes that are in different chains or the same chain are linked to each other if their triple patterns are equivalent; and
inserting the chain of nodes for each subscription into a queue by using a chain ordering algorithm.

2. The system of claim 1, wherein the reasoner is a description logic (DL) reasoner.

3. The system of claim 2, wherein the expanded event includes the original event and new OWL assertions.

4. The system of claim 3, wherein the new OWL assertions are a set of triples that describe additional information about the original event.

5. The system of claim 1, wherein a graph pattern of a first subscription of the subscriptions is a set of triple patterns, wherein each triple pattern includes three elements and each element is a resource description framework (RDF) term or variable,
wherein the first subscription includes a set of value constraints, wherein a value constraint in the first subscription is a boolean-valued expression of variables defined in the graph pattern of the first subscription.

6. The system of claim 5, wherein the expanded event is matched to the first subscription by,
determining if there is a pattern solution defined on the variables in the graph pattern of the first subscription such that:
after substituting variables in the graph pattern of the first subscription according to the pattern solution, the resulting graph is a sub-graph of the expanded event; and for every value constraint in the first subscription, a logical expression obtained after substituting variables in the value constraints of the first subscription according to the pattern solution is true, wherein if the pattern solution is satisfied, the original event matches the first subscription.

7. The system of claim 1, wherein the expanded event is matched to the subscription by, beginning with a first subscription in the queue and continuing until the queue becomes empty, for each subscription, evaluating the nodes in its chain of nodes from top to bottom, and for each node, checking the node against the event and finding solutions for the variables in the triple pattern of the node, wherein if no solution is found, discarding the currently evaluated subscription and proceeding to the step of evaluating the node for a next subscription, wherein if all nodes in the chain of nodes for the currently evaluated subscription have one or more solutions, computing a set of combined solutions for all variables in the currently evaluated subscription, wherein for each combined solution, checking value constraints of the currently evaluated subscription to determine if the combined solution satisfies these constraints, wherein if there is at least one combined solution that satisfies all value constraints in the currently evaluated subscription, returning the event as a match to the subscriber from whom the currently evaluated subscription was received.

8. The system of claim 1, wherein when a new subscription is received the new subscription is stored in the linked-chains structure by, creating a new chain of nodes for the new subscription, wherein the nodes in the new chain of nodes are ordered from top to bottom in decreasing selectivity;

for each node in the new chains of nodes, an equivalent node having an equivalent triple pattern in the existing chains of nodes is searched for, and if an equivalent node is found, a link between the equivalent nodes is created; and inserting the new chain of nodes into the queue by using the chain ordering algorithm.

9. The system of claim 1, wherein the chain ordering algorithm determines an order of subscriptions in the queue by, constructing a complete graph and a weight function, wherein each node in the complete graph corresponds to one subscription, and a weight of an edge of the complete graph is a cost difference of evaluating a first subscription of a pair of subscriptions before a second subscription of the pair of subscriptions, as compared to evaluating the second subscription before the first subscription;

sorting the edges in an increasing order of weights;

starting from a least-weighted edge and continuing until a greatest-weighted edge, selecting the edge, if the edge alone or together with an already selected edge, does not cause a vertex to have a degree of three or more and does not form a cycle, unless the number of selected edges equals the number of vertices in the set of nodes in the complete graph; and outputting a set of edges that covers the vertex and that has a least cost, wherein the set of edges defines the order of the subscriptions in the queue.

10. A computing apparatus for a semantic publish-subscribe system, comprising:

a subscription maintenance module for receiving and storing subscriptions that are described in web ontology language (OWL) graph patterns from a plurality of subscribers;

a reasoning module for receiving events that are described in semantic graphs formed by OWL assertions from a plurality of publishers and for expanding the OWL assertions of the events to produce expanded events;

a matching module for matching the expanded events to the subscriptions and notifying subscribers whose interests match the events; and a linking module for creating a chain of nodes for each of the subscriptions and linking equivalent nodes in one or more of the chains of nodes so that a node which is equivalent to at least one other node is discarded so that it will not be evaluated again during the matching.

11. A computer program product comprising a non-transitory computer useable medium having computer readable program code recorded thereon for matching an event to a subscription in a semantic publish-subscribe system, the computer readable program code comprising:

computer readable program code for receiving and storing subscriptions that are described in web ontology language (OWL) graph patterns from a plurality of subscribers;

computer readable program code for receiving events that are described in semantic graphs formed by OWL assertions from a plurality of publishers and for expanding the OWL assertions of the events to produce expanded events;

computer readable program code for matching the expanded events to the subscriptions and notifying subscribers whose interests match the events; and computer readable program code for creating a chain of nodes for each of the subscriptions and linking equivalent nodes in one or more of the chains of nodes so that a node which is equivalent to at least one other node is discarded so that it will not be evaluated again during the matching.

12. A method for matching an event to a subscription in a semantic publish-subscribe system, comprising:

receiving and storing subscriptions that are described in web ontology language (OWL) graph patterns from a plurality of subscribers;

receiving an event from a publisher that is described in a semantic graph formed by OWL assertions;

expanding the OWL assertions of the event by using reasoning to produce an expanded event;

matching the expanded event to a subscription; and notifying the subscriber whose interest matches the event, wherein the subscriptions are stored in a linked-chains structure by, creating a chain of nodes for each subscription, wherein for each subscription each node in the chain of nodes represents a triple pattern in the subscription;

arranging the nodes in each chain of nodes in a decreasing order of selectivity, wherein nodes that are in different chains or the same chain are linked to each other if their triple patterns are equivalent; and inserting the chain of nodes for each subscription into a queue by using a chain ordering algorithm, and wherein the method is performed using a processor.

13. The method of claim 12, wherein the reasoning is description logic (DL) reasoning.

14. The method of claim 13, wherein the expanded event includes the original event and new OWL assertions.

15. The method of claim 14, wherein the new OWL assertions are sets of triples that describe additional information about the original event.

16. The method of claim 12, wherein a graph pattern of a first subscription of the subscriptions is a set of triple patterns, wherein each triple pattern includes three elements and each element is a resource description framework (RDF) term or variable, wherein the first subscription includes a set of value constraints, wherein a value constraint in the first subscription is a boolean-valued expression of variables defined in the graph pattern of the first subscription.

17. The method of claim 16, wherein the expanded event is matched to the first subscription by, determining if there is a pattern solution defined on the variables in the graph pattern of the first subscription such that:

after substituting variables in the graph pattern of the first subscription according to the pattern solution, the resulting graph is a sub-graph of the expanded event; and for every value constraint in the first subscription, a logical expression obtained after substituting variables in the value constraints of the first subscription according to the pattern solution is true, wherein if the pattern solution is satisfied, the original event matches the first subscription.

* * * * *